(12) United States Patent
Liebenow

(10) Patent No.: US 6,480,673 B2
(45) Date of Patent: Nov. 12, 2002

(54) INSTANT PHOTO KIOSK

(75) Inventor: Frank Liebenow, Dakota Dunes, SD (US)

(73) Assignee: Gateway, Inc., North Sioux City, SD (US)

( * ) Notice: Subject to any disclaimer, the term of this patent is extended or adjusted under 35 U.S.C. 154(b) by 0 days.

(21) Appl. No.: 09/751,491

(22) Filed: Dec. 29, 2000

(65) Prior Publication Data

US 2002/0085840 A1 Jul. 4, 2002

(51) Int. Cl.[7] ............................................... G03B 15/00

(52) U.S. Cl. .............................. 396/2; 396/429; 355/40

(58) Field of Search ..................... 396/429, 2; 355/40, 355/39

(56) References Cited

U.S. PATENT DOCUMENTS

| | | | | |
|---|---|---|---|---|
| 5,923,407 A | * | 7/1999 | Hinton | 355/27 |
| 5,974,393 A | * | 10/1999 | McCullough et al. | 340/311.2 |
| 5,999,088 A | * | 12/1999 | Sibbitt | 340/7.55 |
| 6,285,410 B1 | * | 9/2001 | Marni | 348/370 |
| 6,322,260 B1 | * | 11/2001 | Manico et al. | 396/599 |

* cited by examiner

Primary Examiner—David M. Gray
(74) Attorney, Agent, or Firm—Mark S. Walker; Ivan Posey

(57) ABSTRACT

A standalone kiosk accepts photographic data from a customer for printing one or more photographs from that photographic data. The kiosk may estimate the amount of time required to generate physical prints of the photographic data and display that time estimate to the customer. The kiosk establishes a connection with a wireless communications device carried by the customer and notifies the customer when the printed photographs are complete. The kiosk may dispense a wireless communications device; such as a pager, to the customer to allow for such a connection.

31 Claims, 2 Drawing Sheets

INSTANT PHOTO KIOSK

BACKGROUND OF THE INVENTION

The field of invention is photography, and more specifically printing photographic images from data provided by a customer.

The field of photography has evolved quickly in the past decade. Many people now take photographs with digital cameras, rather than traditional film-based cameras. The resultant digital images may be easily placed onto a web page and sent to friends and family via electronic mail. However, many people wish to have physical prints of their photos, in order to frame or display them, or view them at a location away from their computer. While special printers may be used to print digital photographic images onto paper at the expected resolution of a photograph and in standard photographic sizes, the cost of these printers place them out of reach of most individuals. Individuals can take or transmit their photographic data to a central location having a printer, but then face a delay before prints are available. The length of the delay is typically not precisely known in advance, which can discourage a potential customer from printing a digital photographic image.

SUMMARY OF PREFERRED EMBODIMENTS

A standalone kiosk accepts photographic data from a customer for printing one or more photographs from that photographic data.

In an aspect of a preferred embodiment, the kiosk estimates the amount of time required to generate physical prints of the photographic data, and displays that time estimate to the customer.

In another aspect of a preferred embodiment, the kiosk establishes a connection with a wireless communications device carried by the customer and notifies the customer when the printed photographs are complete, so that the customer need not wait by the kiosk during the printing process.

DETAILED DESCRIPTION OF PREFERRED EMBODIMENTS

Figure 1:
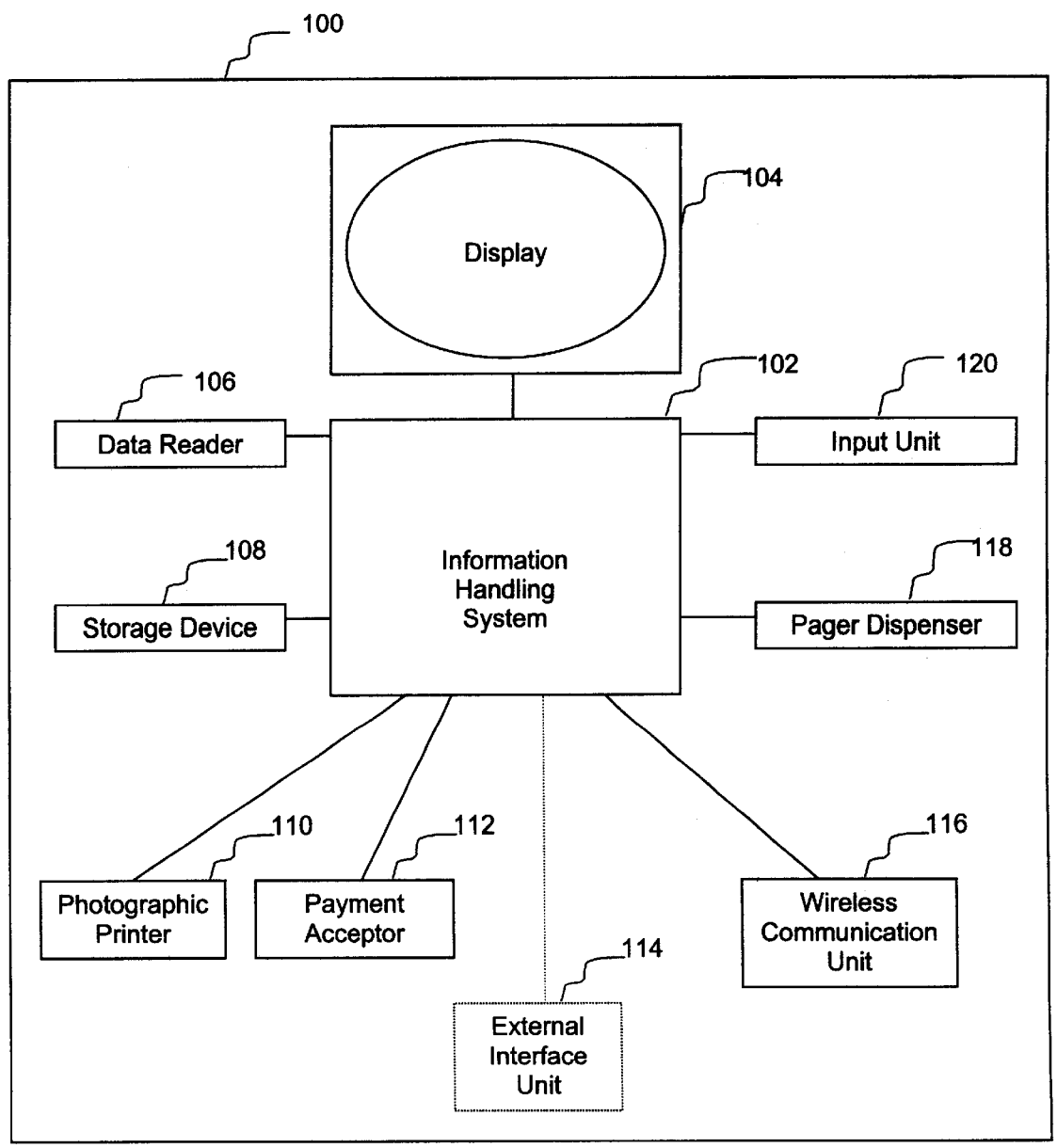
FIG. 1 is a schematic view of an instant photo kiosk.

Referring to FIG. 1, a schematic view of an instant photo kiosk 100 is shown. The kiosk 100 may be located in a dedicated stand-alone cabinet, in a wall, in a cabinet with other devices, or in another housing or location. The particular physical embodiment of the kiosk 100, such as the size and shape of its cabinet, or the presence of a dedicated cabinet at all, is not critical to the invention. The kiosk 100 includes an information handling system 102 that controls the operation of the kiosk 100. The information handling system 102 may be any computing device capable of executing instructions and handling inputs and outputs necessary to the operation of the kiosk. For example, the information handling system 102 may be a microprocessor chip, an application-specific integrated circuit (ASIC), field-programmable gate array (FPGA), or other chip-scale device. As another example, the information handling system 102 may be an off-the-shelf computer, including a motherboard and interface card slots in addition to a microprocessor chip. A different device, or combination of devices, may be used as an information handling system 102 if desired.

The information handling system 102 is electrically connected to a display 104. The display 104 is used to present information to a customer. The display 104 may be a cathode ray tube, a flat panel liquid crystal display, or any other device capable of displaying information to a customer. Optionally, the display 104 may be a touch screen, allowing a customer to enter data into the information handling system 102 by touching the display 104, such that the display 104 functions as an input device as well as an output device.

The information handling system 102 is also electrically connected to at least one data reader 106. The data reader 106 may be any device adapted to read a portable data storage device. For example, the data reader 106 may be a removable cartridge disk drive adapted to read a popular format of removable disk cartridge; a device adapted to read a flash memory card; a CD-ROM drive adapted to read data from a compact disk; a device adapted to read a proprietary memory storage format; or any other device capable of reading a portable data storage device on which a customer may store photographic data. The data reader 106 may instead be adapted to receive data sent to it by a customer over a wireless connection. For example, the data reader 106 may be adapted to receive data from a personal digital assistant (PDA) that is beamed to the data reader 106 at an infrared wavelength or using the standard Bluetooth protocol, or the data reader 106 may be adapted to receive data stored in a PDA through a cellular or Personal Communications System (PCS) telephone connection. As another example, the data reader 106 may include a docking station for a PDA, allowing the PDA to be placed in physical and electrical contact with the data reader 106 for data transfer. Advantageously, more than one data reader 106 is used in the kiosk 100, thereby allowing different customers using different storage media or transmission devices to utilize the same kiosk 100.

A storage device 108 is also electrically connected to the information handling system 102. The storage device 108 is adapted to store the photographic data received through the data reader 106 from a customer. The storage device 108 may also store other data, such as instructions for execution by the information handling system 102. The storage device 108 is preferably a hard disk drive, which is standard in the art. However, other types of storage or memory may be used if desired, such as but not limited to flash memory or random access memory.

A photographic printer 110 is also electrically connected to the information handling system 102. The photographic printer 110 is used to print photographs from the data stored in the storage device 108. The photographic printer 110 is standard in the art, and preferably is able to print photographs in a variety of popular sizes.

A payment acceptor 112 is preferably also electrically connected to the information handling system 102. The payment acceptor 112 is adapted to accept cash or cash equivalents from a customer using the kiosk 100. The payment acceptor 112 may be a point-of-sale unit adapted to read a credit card or debit card that is swiped through it, which is standard in the art. The payment acceptor 112 instead may be a bill acceptor for receiving paper currency, which is also standard in the art. The payment acceptor 112 may include provisions for returning change to the customer in the form of coins or paper currency. Advantageously, more than type of one payment acceptor 112 is provided as part of the kiosk 100, allowing customers to pay with a number of different monetary equivalents.

A wireless communications unit 116 is preferably also electrically connected to the information handling system 102. The wireless communications unit 116 provides a communications link to a wireless device carried by a customer, as will be discussed in greater detail below. The wireless communications unit 116 preferably operates at a frequency or frequencies compatible with the local standards for wireless voice and pager communications, such that the wireless communications unit 116 may telephone or page a customer carrying a pager, cellular phone, PCS phone, PDA with data or voice transmission capability, or other wireless telecommunications device. The wireless communications unit 116 may also operate on another band, if desired.

Optionally, a pager dispenser 118 may be provided as part of the kiosk 100 and electrically connected to the information handling system 102. The pager dispenser 118 preferably stores a number of pagers. One of those pagers may be dispensed to a customer upon the receipt of a deposit, such as a credit card number, from the customer. The deposit is preferably collected via the payment acceptor 112. The pager dispenser 118 preferably includes provisions for recharging the pagers stored within. The pager dispenser 118 need not dispense pagers, and instead may dispense other wireless communications devices operating on a different frequency or protocol. By providing a special device operating on a special frequency, the likelihood that a customer may be tempted to steal the wireless communications device is reduced. The pager dispenser 118 may store and dispense the pagers in any manner; the particular configuration of the pager dispenser 118 is not critical to the invention.

Optionally, an external interface unit 114 may be provided as part of the kiosk 100. If so, the external interface unit 114 is electrically connected to the information handling system 102. The external interface unit 114 connects the kiosk 100 to an external communications network such as the Internet. The external interface unit 114 may be any device capable of connecting the kiosk 100 to an external communications network, such as but not limited to a modem, a cable modem, a DSL modem, a network interface unit, or other device. The functions that may be performed by the external interface unit 114 may instead be performed by the wireless communications unit 116, reducing the number of physical connections that must be made between the kiosk 100 and its surroundings. The external interface unit 114 may be combined with the wireless communications unit 116, if desired.

An input unit 120 is also preferably electrically connected to the information handling system 102. The input unit 120 may be a keyboard, keypad, trackball, or other device or combination thereof, through which the customer can interact with the kiosk 100. The input unit 120 may be combined with the display 104 if the display 104 is a touchscreen.

The components of the kiosk 100 described above may be electrically connected serially, in parallel, via a bus, in a star configuration, or in any other fashion that allows digital and/or analog signals to travel between those components as needed.

Figure 2:
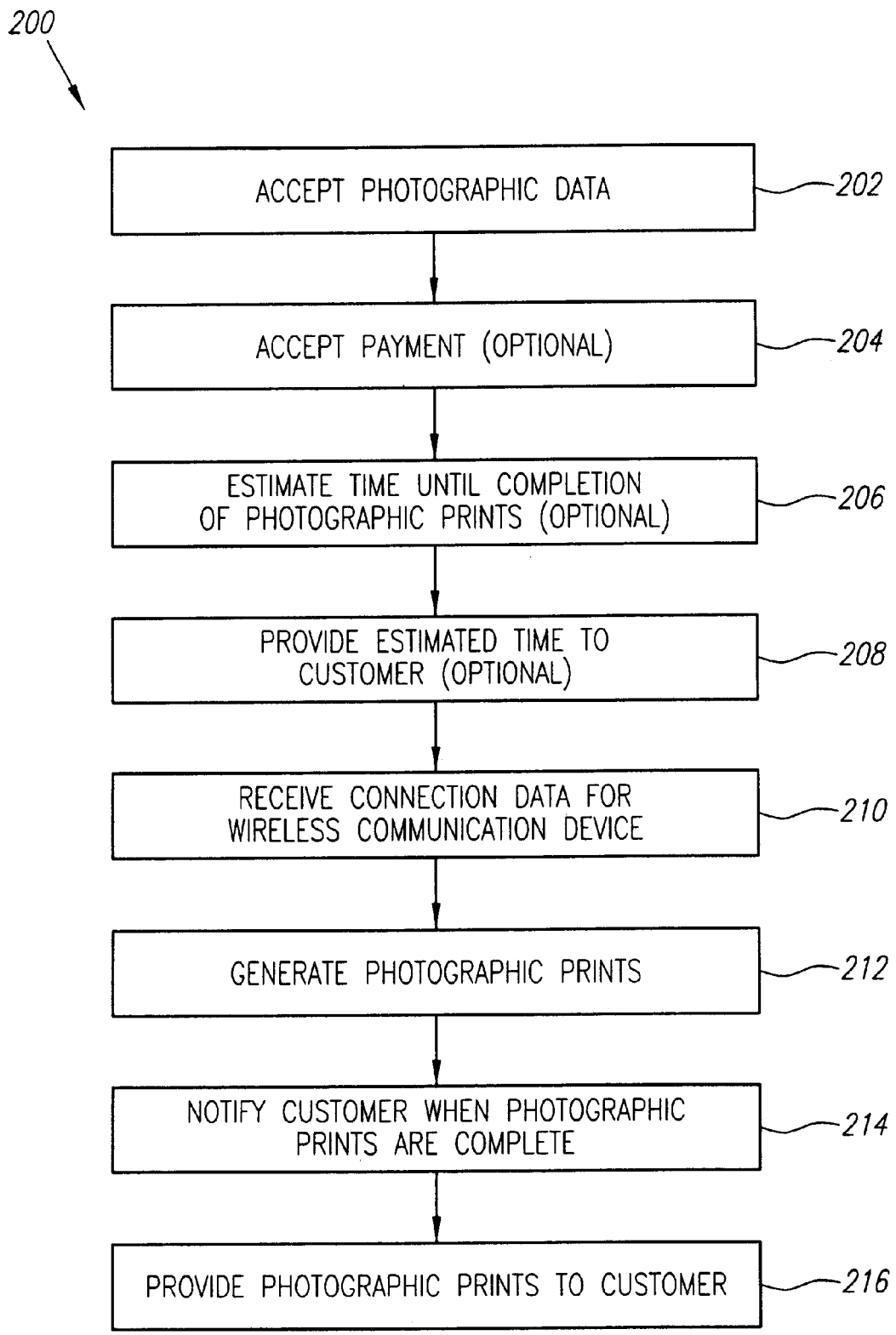
FIG. 2 is a flow chart illustrating a method for processing photographic data with an instant photo kiosk.

Referring as well to FIG. 2, a method 200 is shown for generating photographic prints from photographic data using the kiosk 100 as described above. In step 202, the kiosk 100 accepts photographic data from a customer. The photographic data may be acquired by the kiosk 100 in a number of ways. In one embodiment, the customer inserts a portable data storage device into the data reader 106, which engages the portable data storage device and initiates the data transfer process. In another embodiment, the customer transmits photographic data to the kiosk 100 via the wireless communications unit 116 from a PDA or other device adapted for wireless data transmission. In another embodiment, the kiosk 100 receives photographic data via the external interface unit 114 rather than the data reader 106. For example, the customer may send the photographic data to the kiosk 100 via electronic mail before physically arriving at the kiosk 100. As another example, the customer may use the kiosk 100 to access a remote storage unit where photographic data is stored via the external interface unit 114, and initiate the transfer of that photographic data to the kiosk 100. As another example, the photographic data may be accepted from the customer in the form of photographic film. The process 200 proceeds in the same manner regardless of the form of photographic data input into the kiosk 100.

The photographic data received by the kiosk 100 is preferably transmitted to the storage device 108 via the information handling system 102. Preferably, the photographic data received from the customer is stored in one or more files uniquely associated with that customer. The storage device 108 preferably stores that photographic data until it is utilized to generate photographic prints.

The information handling system 102 may transmit images to the display 104 for viewing by the customer before or during the acceptance of photographic data. For example, the information handling system 102 may provide interactive help. As another example, the information handling system 102 may transmit to the display 104 the images acquired from the customer, so that the customer can review that photographic data before continuing. The kiosk 100 may also offer the ability to make adjustments to the images before they are printed such as lighten/darken, crop or rotate. As another example, the information handling system 102 may periodically transmit to the display 104 a splash screen or a video clip when the kiosk 100 is not in use, demonstrating the use of the kiosk 100 and the method by which a customer can enter photographic data into the kiosk 100.

Step 204 is optional. In step 204, the kiosk 100 accepts payment via the payment acceptor 112 from the customer for the photographic prints to be generated from the photographic data received in step 202. In one embodiment, the customer may swipe a credit card or debit card through the payment acceptor 112. Payment information is transmitted from the payment acceptor 112 to the information handling system 102, which determines whether adequate payment has been received for the kiosk 100 to begin printing the photographic data. The payment acceptor 112 may be connected to a communications network via the external interface unit 114, such that the external interface unit 114 can communicate in a standard fashion with the entity that issued the credit or debit card and verify that the card is acceptable for payment. In another embodiment, the customer may insert one or more bills of paper money, or coins, into the payment acceptor 112.

Alternately, the payment acceptor 112 is not used to accept payment from the customer. Instead, the customer may access electronic currency or initiate an electronic funds exchange via the external interface unit 114 or wireless communications unit 116. For example, the kiosk 100 may offer the customer the option of paying for the prints using one or more particular on-line services adapted to transfer funds to the kiosk 100 electronically.

Alternately, payment is made via the kiosk 100 and the external interface unit 114 to a device at a separate location associated with the owner of the kiosk 100. After that device receives payment for the prints, it transmits an authorization code back to the kiosk 100 via the external interface unit 114 indicating that payment has been made, or provides a code to the customer for manual entry into the kiosk 100 via the input unit 120. Other methods for accepting payment for the prints and confirming that payment may be used if desired.

If step 204 is omitted, the customer may pay for the prints in another manner. For example, the customer may pay at the front counter of a business having the kiosk 100 on its premises. As another example, the kiosk 100 may include a printer (not shown) for printing a receipt indicating the cost of the prints produced, which the customer can provide to a cashier or salesperson for payment. Other methods of payment are within the scope of this method.

Steps 206 and 208 are also optional. In step 206, the information handling system 102 estimates the amount of time that will be required to convert the photographic data received in step 202 into completed photographic prints. This estimate preferably takes into account various factors such as the number of individual images within the photographic data stored in the storage unit 108, the type of special processing of the prints chosen by the customer, if any, the desired quality of the resulting prints, and the number of other customers, if any, awaiting printing of their photographic data. In step 208, the information handling system 102 transmits that estimated processing time to the display 104, where it is shown to the customer. By providing an estimated time for completion of prints, the customer can better manage his or her time between deposit of the photographic data and the completion of the prints. Optionally, the customer may be given the option in step 208 to cancel the photographic processing transaction and delete the photographic data that the customer has input into the storage unit 108, if the estimated time is longer than convenient for the customer.

Moving to step 210, the kiosk 100 receives connection data for a wireless communications device carried by the customer. This connection data may be provided to the kiosk in several ways. Preferably, the kiosk 100 initially determines whether the customer has a wireless communications device such as a pager or a wireless phone. To do so, the information handling system 102 preferably transmits to the display 104 text and/or graphics asking the customer to input a yes or no response to the question of whether the customer has a wireless communications device. If the customer does have a wireless communications device, then the information handling system 102 preferably prompts the customer to enter the number or other unique identifier of that wireless communications device through the input unit 120. The customer then enters the telephone number of his or her wireless communications device via the input unit 120, which is then stored in the information handling system 102 or the storage device 108. That stored connection data is then connected with the photographic data in the storage device 108 that was previously entered by the customer in step 202. In one embodiment, if the customer has a PDA with wireless communications capability, the kiosk 100 may connect to the PDA via the wireless communications unit 116 and automatically search for and copy communications information from that PDA. In another embodiment, after acquiring connection data for a PDA, the kiosk 100 may push a computer program to the PDA that facilitates connection to the kiosk 100.

If the customer does not have a wireless communications device and indicates that to the kiosk 100, the information handling system 102 preferably initiates a procedure for dispensing a pager to the customer from the pager dispenser 118. First, the information handling system 102 prompts the customer to place a deposit for the pager, by transmitting that request to the display 104 in text and/or graphic form to be shown to the customer. Next, the kiosk 100 receives a deposit for the pager. Preferably, the deposit is provided by receiving a credit card or debit card in the payment acceptor 112 and verifying the available credit associated with that card by a standard process. However, the deposit may be accepted in other forms if desired. The deposit is credited or otherwise returned to the customer when the pager is returned to the kiosk 100, and thereby acts to discourage retention of the pager by the customer. Alternately, the deposit is not charged unless the customer fails to return the pager in a certain period of time. After the deposit has been received, the information handling system 102 determines which particular pager within the pager dispenser 118 will be released to the customer. The information handling system 102 stores or otherwise notes the telephone number or other connection information of that pager, and associates that number or connection information with the photographic data received from that customer and stored in the storage device 108. The pager dispenser 118 then dispenses that pager to the customer.

Next, in step 212, the kiosk 100 proceeds to generate photographic prints from the photographic data received from the customer in step 202, using the photographic printer 110. The physical handling of those prints within the kiosk 100 is not critical to the invention. In one embodiment, the prints are output into an open external bin. In another embodiment, the prints are output to an internal storage space within the kiosk 100 that is not accessible to the customer until an event, such as a password being entered, or a payment being made, or a pager being returned, occurs. In another embodiment, the prints are output to one of a plurality of external bins, which may be viewed by but not accessed by the customer. The prints may be placed into an envelope or other organizing device if desired. Other structures and methods for outputting, storing and/or securing the prints may be used if desired.

After the photographic prints have been generated, the process moves to step 214, in which the kiosk 100 notifies the customer that the prints are complete. The kiosk 100 establishes a communications connection with the wireless communications device carried by the customer, using the connection data received in step 210 and stored in conjunction with the photographic data. Preferably, the kiosk 100 places a call to the pager dispensed to the customer in step 210, causing the pager to beep or buzz, and alerting the customer that his or her prints have been completed. The kiosk 100 may alert the customer in other ways, depending on the connection data received in step 210. As an example, if the customer already has a pager, cellular phone, PCS phone or other such portable communications device and has input the number of that device into the kiosk 100 in step 210, the kiosk 100 may dial that number in step 214 after the prints are complete. It may send a message if such is a data device (e.g., a pager) or may send a prerecorded voice message if such is a voice device (e.g., cellular phone). As another example, if the customer has a PDA with wireless communications capability, the customer may enter the email address or IP address of that PDA into the kiosk 100 via the input unit in step 210, and the kiosk 100 may then transmit a message to the PDA via email, direct IP messaging, instant messaging or otherwise in step 214 after the prints are complete. As another example, if the customer has a PDA to which a computer program was pushed in step 210, the kiosk 100 may transmit data to the PDA in step 214 after the prints are complete, triggering the computer program to cause the PDA to beep and display a message that the prints are finished and waiting at the kiosk 100.

Notification of the customer may be performed in different ways on the same wireless communications device, preferably at the choice of the customer. For example, a customer may be paged on his or her wireless telephone upon completion of the prints. In another embodiment, a customer may receive an email message on the screen of his or her wireless telephone, or a pre-recorded message, informing the customer that his or her prints are complete and waiting at the kiosk 100.

Communications between the kiosk 100 and the customer may be handled through the wireless communications unit 116 or the external interface unit 114. Such communications are preferably transmitted via a local wireless telecommunications system, to which the kiosk 100 connects on the same terms as any other telecommunications device. That is, preferably the wireless communications unit 116 connects the kiosk 100 to the local wireless telecommunications system, which then connects to the wireless communications device carried by the customer. In another embodiment, the pagers dispensed to customers in step 210 are adapted for direct wireless connection with the wireless communications unit 116 over a frequency other than a cellular or PCS frequency.

Step 214 may be performed while the prints are being generated in step 212, or shortly before step 212. In this way, the customer can walk back to the kiosk 100 as the printer 110 is printing photographs, saving some time in the overall process 200.

In response to the notification received in step 214, the customer returns to the kiosk 100. Next, in step 216, the finished prints are provided to the customer. The prints may be provided to the customer in a number of ways. In one example, the prints are waiting in an output bin or tray at the printer 110, and the customer picks them up and pays for them at a nearby cash register. In another example, the prints are held within the kiosk 100 until the customer returns the pager and the kiosk 100 confirms that the pager is returned. In this way, the likelihood that a customer will inadvertently or intentionally retain the pager is minimized. In another example, the prints are held within the kiosk 100 until the customer identifies himself or herself to the kiosk 100, such as by entering a code via the input unit 120, or calling the kiosk 100 with a wireless phone such that the kiosk can identify the caller ID signal of the wireless phone. The prints are then dispensed to the customer, in order to ensure that each set of prints is received by the correct customer.

The optional step 204 may be performed after step 212 but before step 216, in order to accept payment for the prints at the end of the printing process, instead of the beginning. If so, in an exemplary embodiment, the customer is electronically charged for the prints via the payment acceptor 112 before the prints are released, and the prints are waiting at the printer 110 for customer pickup in step 216.

A preferred instant photo kiosk and method for processing photographic data, and many of their attendant advantages, have thus been disclosed. It will be apparent, however, that various changes may be made in the content and arrangement of the steps of the process, or in the form, construction and arrangement of the parts, without departing from the spirit and scope of the invention, the methods and forms hereinbefore described being merely preferred or exemplary embodiments thereof. Therefore, the invention is not to be restricted or limited except in accordance with the following claims and their legal equivalents.

What is claimed is:

1. A method for printing photographs at a kiosk for a customer having a wireless communications device, comprising:
   accepting photographic data from a customer;
   receiving connection data for a wireless communications device of the customer;
   printing at least one photograph from the photographic data;
   establishing a connection to the wireless communications device; and
   notifying the customer over the connection that the at least one photograph has been printed.

2. The method of claim 1, wherein the receiving step comprises the step of connecting to the wireless communications device.

3. The method of claim 1, wherein the receiving step comprises the step of receiving input from the customer.

4. The method of claim 1, wherein the establishing step comprises the step of placing a telephone call to the wireless communications device.

5. The method of claim 1, wherein the establishing step comprises the step of paging the wireless communications device.

6. The method of claim 1, wherein establishing step comprises the step of transmitting an electronic mail message to the wireless communications device.

7. The method of claim 1, further compressing the step of accepting payment from the customer.

8. The method of claim 1, further comprising the steps of estimating the time until the photographic data is printed; and providing the estimated time to the customer.

9. A method for printing photographs at a kiosk for a customer, comprising:
   accepting photographic data from a customer;
   automatically dispensing a wireless communications device to the customer;
   printing at least one photograph from the photographic data;
   establishing a connection to the wireless communications device; and
   notifying the customer over the connection when the at least one photograph has been printed.

10. The method of claim 9, wherein the wireless communications device is a pager, and wherein the notifying step comprises the step of paging the customer.

11. The method of claim 9, further comprising the step of accepting a deposit for the wireless communications device.

12. The method of claim 9, further comprising the steps of:
   determining whether the wireless communications device has been returned; and
   dispensing the at least one photograph to the customer if the wireless communications device has been returned.

13. The method of claim 9, further comprising the step of accepting payment from the customer.

14. The method of claim 9, further comprising the steps of estimating the time until the photographic data is printed; and
   providing the estimated time to the customer.

15. A kiosk for printing photographs for a customer, comprising:
   an information handling system;
   a data reader coupled to the information handling system;

a printer coupled to the information handling system; and a wireless communications unit coupled to the information handling system;

wherein the information handling system comprises
instructions for accepting photographic data from the customer through the data reader;
instructions for printing on the printer at least one photograph from the photographic data; and
instructions for notifying the customer through the wireless communications unit that the at least one photograph has been printed.

16. The kiosk of claim 15, farther comprising:

a payment acceptor connected to the information handling system; and a pager dispenser connected to the information handling system, the pager dispenser adapted to contain at least one pager;

wherein the information handling system further comprises
instructions for accepting a deposit for a pager through the payment acceptor, and
instructions for dispensing the pager from the pager dispenser to the customer; and wherein the instructions for notifying comprise activating the pager with a transmission through the wireless communications unit.

17. The kiosk of claim 15, wherein the customer has a wireless communications device having an identifier; further comprising an input unit connected to the information handling system, wherein the information handling system further comprises instructions for accepting the identifier through the input unit; and wherein the instructions for notifying comprise connecting the wireless communications unit to the wireless communications device.

18. The kiosk of claim 15, wherein the wireless communications unit is adapted to communicate with both a customer supplied wireless communications device and a kiosk supplied wireless communication device.

19. A method for printing photographs at a kiosk for a user, comprising:

receiving photographic data;

determining whether a user requires a wireless communication device;

storing connection data for a wireless communications device;

printing at least one photograph from the photographic data;

establishing a connection to the wireless communications device; and notifying the user over the connection that the at least one photograph has been printed.

20. The method of claim 19, wherein the wireless communication device is a user supplied wireless communication device.

21. The method of claim 20 wherein the storing step comprises the step of connecting to the user supplied wireless communications device.

22. The method of claim 20, wherein the storing step comprises the step of receiving input from the user.

23. The method of claim 19, wherein the establishing step comprises the step of placing a telephone call to the wireless communications device.

24. The method of claim 19, wherein the establishing step comprises the step of paging the wireless communications device.

25. The method of claim 19, wherein establishing step comprises the step of transmitting an electronic mail message to the wireless communications device.

26. The method of claim 19, further comprising the step of accepting payment from the user.

27. The method of claim 19, further comprising the steps of estimating the time until the photographic data is printed; and providing the estimated time to the user.

28. The method of claim 19, further comprising the steps of dispensing a wireless communications device to the user.

29. The method of claim 28, wherein the wireless communications device is a pager, and wherein the notifying step comprises the step of paging the customer.

30. The method of claim 28, further comprising the step of accepting a deposit for the wireless communications device.

31. The method of claim 28, further comprising the steps of:

determining whether the wireless communications device has been returned; and dispensing the at least one photograph to the customer if the wireless communications device has been returned.

* * * * *